United States Patent [19]
Shiraishi et al.

[11] Patent Number: 5,239,403
[45] Date of Patent: Aug. 24, 1993

[54] OPTICAL DEFLECTOR DEVICE FOR DEFLECTING LASER BEAM

[75] Inventors: Takashi Shiraishi, Tokyo; Masao Yamaguchi, Yokohama; Ken Omura, Tokyo; Naruhito Yoshida, Yokohama, all of Japan

[73] Assignee: Kabushiki Kaisha Toshiba, Kawasaki, Japan

[21] Appl. No.: 621,817

[22] Filed: Dec. 4, 1990

[30] Foreign Application Priority Data

Dec. 7, 1989 [JP] Japan .................. 1-316380

[51] Int. Cl.$^5$ .......................... G02B 26/08
[52] U.S. Cl. .................. 359/218; 359/219; 250/236
[58] Field of Search ........... 359/216, 217, 218, 219; 235/467, 462; 250/235, 236

[56] References Cited

U.S. PATENT DOCUMENTS

| | | | |
|---|---|---|---|
| 4,101,365 | 7/1978 | Fisli ........................... | 359/217 |
| 4,357,071 | 11/1982 | Mankel et al. ................ | 359/218 |
| 4,560,862 | 12/1985 | Eastman et al. .............. | 359/219 |
| 4,624,528 | 11/1986 | Brueggemann ............... | 359/216 |
| 4,643,518 | 2/1987 | Taniguchi .................... | 359/218 |
| 4,820,911 | 4/1989 | Arackellian et al. .......... | 235/467 |
| 4,875,748 | 10/1989 | Matsumoto et al. ........... | 359/218 |

FOREIGN PATENT DOCUMENTS

| | | | |
|---|---|---|---|
| 0348232 | 12/1989 | European Pat. Off. ......... | 359/216 |
| 0173211 | 8/1986 | Japan .......................... | 359/218 |
| 0119514 | 5/1987 | Japan .......................... | 359/216 |
| 0080923 | 3/1989 | Japan .......................... | 359/217 |
| 0116514 | 5/1989 | Japan .......................... | 359/216 |

*Primary Examiner*—Loha Ben
*Attorney, Agent, or Firm*—Foley & Lardner

[57] ABSTRACT

An optical deflector is employed in an optical unit incorporated in a laser beam printer. The optical deflector reflects a laser beam, which is generated by a laser diode toward a photosensitive body and is made to have a cross section of desirable size by a group of conversion lenses. The optical deflector is provided with reflecting surfaces whose cross sections are convex in a main scanning direction. The number of reflecting surfaces is defined by $4 \times m$ (m: a natural number), and therefore the optical deflector has four or eight reflecting surfaces, for instance. Since the number of reflecting surfaces is defined by $4 \times m$, reflecting surfaces can be positioned easily and reliably with reference to the center of the shaft.

3 Claims, 5 Drawing Sheets

OPTICAL DEFLECTOR DEVICE FOR DEFLECTING LASER BEAM

BACKGROUND OF THE INVENTION

1. Field of the Invention

The present invention relates to an optical unit which is employed in a laser beam printer or the like to guide a laser beam generated from a laser diode to an object to be scanned. More particularly, the invention relates to an optical deflector which is incorporated in the optical unit for deflecting the laser beam toward the object to be scanned.

2. Description of the Related Art

In general, an optical unit incorporated in a laser beam printer or the like is designed such that a laser beam output from a laser diode is guided first to a scanner or an optical deflector and then to a photosensitive body, i.e., an object to be scanned. The photosensitive body is scanned with the laser beam at a constant speed. When guided from the laser diode to the photosensitive body, the laser beam passes through a group of focusing lenses. By these focusing lenses, the laser beam is given a cross sectional shape having desirable characteristic, and then falls on a predetermined position on the surface of the photosensitive body.

In this type of optical unit, the optical deflector includes a polygonal mirror having a plurality of nonplanar mirror surfaces. With this polygonal mirror being rotated, the optical deflector reflects the laser beam toward the photosensitive body at a nonuniform angular velocity. The polygonal mirror is coupled to the motor shaft of the optical deflector. In the polygonal mirror included in the above optical deflector, the number of mirror surfaces provided for the polygonal mirror is even, in many cases.

With respect to the polygonal mirror of the above-mentioned type, it is known that the width of the line which is to be scanned with the laser beam deflected by one mirror surface, i.e., that the width of the line on the photosensitive body which is to be scanned in the main scanning direction during one scan, is very narrow. The width of the line to be scanned is in the range of several tens of μm to 100 μm or so. With respect to the polygonal mirror, it is also known that the diameter of the beam spot which the laser beam forms on the photosensitive body varies considerably if the distance between the mirror surface of the polygonal mirror and the shaft of the motor is varied, due to the eccentricity of the polygonal mirror or the tilting of each mirror surface. Therefore, the polygonal mirror and the shaft of the motor have to be coupled together with very high positional accuracy. For example, they have to be coupled together such that a variation in the distance between them is not more than 5 μm or so. Therefore, they are coupled together by use of a method which easily provides high coupling accuracy. For example, they are coupled together by press fitting the shaft of the motor into the predetermined shaft hole of the polygonal mirror.

However, the press fitting of the shaft into the shaft hole of the polygonal mirror does not ensure a satisfactory result, since the shaft may be inserted in a slanted state or the polygonal mirror may receive the shaft eccentricly. Even if the shaft of the motor is inserted accurately at the center of the polygonal mirror, the shaft itself may be slanted with reference to the motor. In such a case, the shaft of the motor rotates in a runout condition, with the result that the mirror surfaces of the polygonal mirror tilt in synchronism with the rotation of the motor. These problems may be solved to some extent by using expensive structural components, such as air bearings, etc., but the use of such structural components naturally results in an increase in manufacturing cost.

SUMMARY OF THE INVENTION

Accordingly, an object of the present invention is to provide an optical deflector containing a polygonal mirror which is coupled to the shaft of a motor with high accuracy to the shaft of a motor.

Another object of the present invention is to provide an optical deflector containing a polygonal mirror with desirable optical characteristics which can be easily coupled to the shaft of a motor.

Still another object of the present invention is to provide an optical deflector which contains a polygonal mirror, the optical characteristics of which are prevented from being adversely affected even if the polygonal mirror becomes eccentric or tilts with reference to the shaft of a motor.

To achieve the above objects, the present invention provides an optical apparatus comprising: means for deflecting a light beam, the deflecting means having $4 \times m$ (m is a natural number) non-planar surfaces for reflecting the light beam; and means for rotating the deflecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1A:
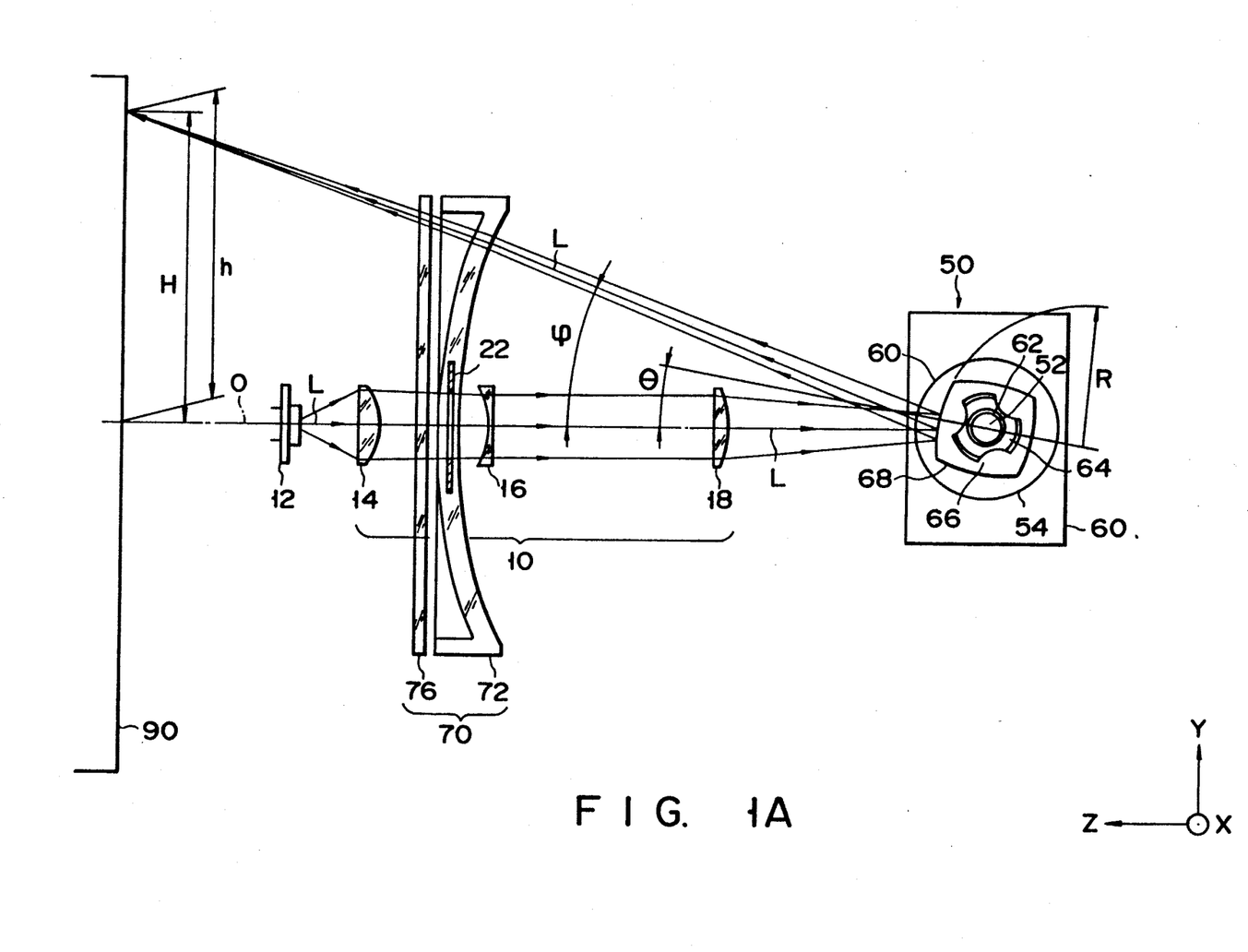
FIG. 1A shows one embodiment of the present invention and is a plan view of an optical unit to be incorporated in a laser beam printer, the arrangement of the optical components of the optical unit being illustrated along with laser beam paths.
Figure 1B:
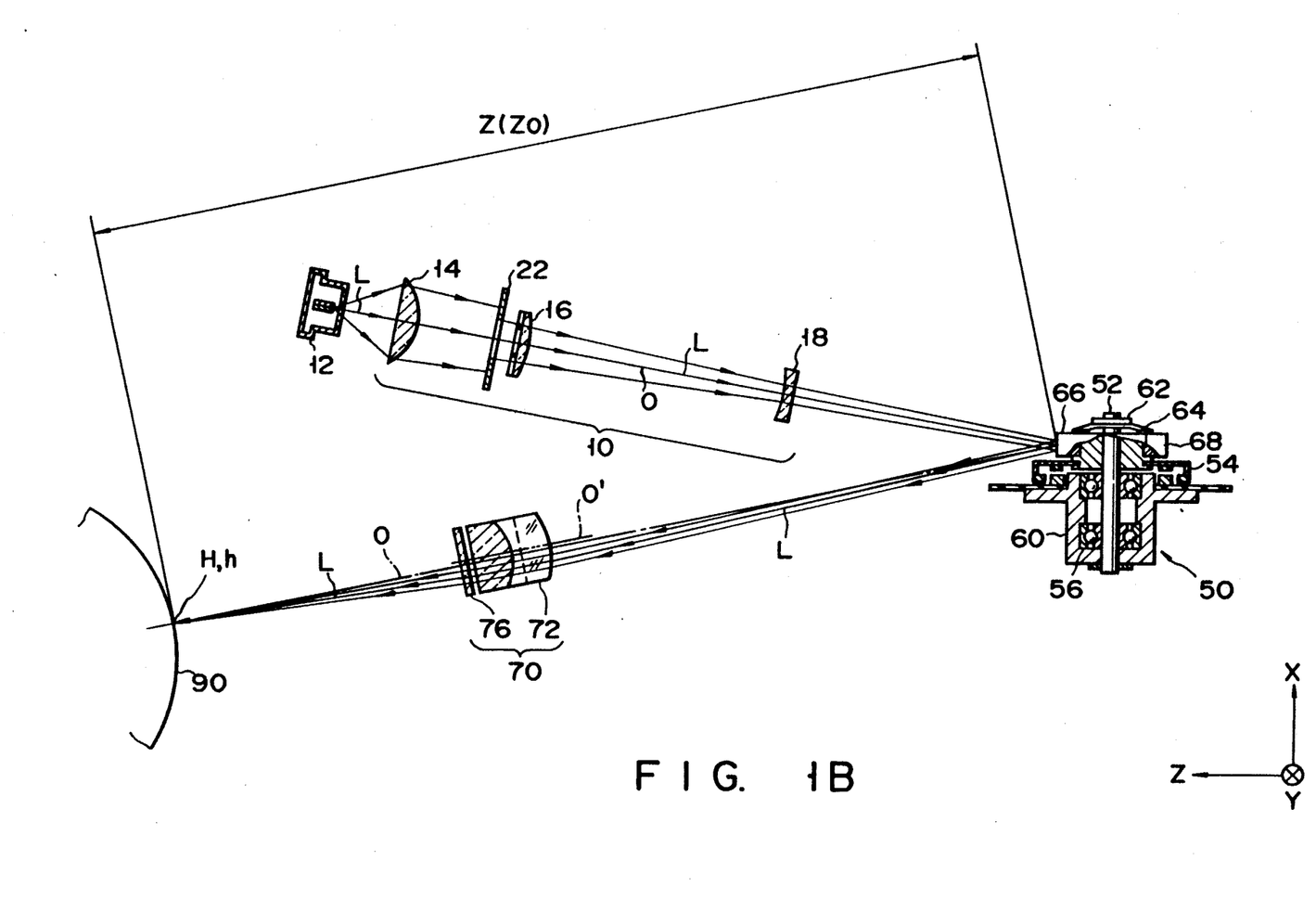
FIG. 1B is a sectional view showing the laser beam paths, the sectional view being obtained by taking the plan view in FIG. 1A along a plane which is in the vicinity of a center determined with reference to a main scanning direction.

In FIGS. 1A and 1B, the laser beam L generated by the laser diode 12 is converged when it passes through the first optical system 10. The laser beam L is directed to the scanner 50, by which the laser beam L is reflected toward the photosensitive body 90, for scanning it at a nonuniform angular velocity. The laser beam L reflected by the scanner 50 is directed first to the second optical system 70. The laser beam L is focused on a desirable point on the surface of the photosensitive body 90 by the second optical system 70. The laser beam L moves over the photosensitive body 90 in the main scanning direction, with keeping the focused condition due to the second optical system 70, as the reflecting surface of the scanner 50 rotates. The distance over which the laser beam L moves in the main scanning direction from the center of the optical axis to a given point is made to correspond to the angle at which the surface of the scanner 50 rotates. The laser beam L, focused on the photosensitive body 90, is modified or ON-OFF controlled by additional units such as a beam modulator, a data input circuit, etc., (not shown) to form character data and/or graphics data on the surface of the photosensitive body 90. Therefore, an electrostatic latent image is formed on the surface of the photosensitive body 90.

The photosensitive body 90 is rotated in a predetermined direction by a driver (not shown). The electrostatic latent image is formed in accordance with the rotation of the photosensitive body 90. The electrostatic latent image, thus formed, is developed by a developing means (not shown), and is then transferred onto a given transferring material (not shown).

Part of the laser beam L passing through the second optical system 70 is reflected by a horizontal synchronization-detecting mirror (not shown) at each scan performed in the main scanning direction. The reflected laser beam L is guided to a synchronization signal detector (not shown), for the detection of horizontal synchronization.

The scanner 50 contains a polygonal mirror 66 having a plurality of mirror surfaces 68 which reflect a laser beam L. Each of the mirror surface 68 has a cross section which is convex in the main scanning direction and constitutes part of a cylindrical face whose radius of curvature is R. The number of mirror surfaces 68 provided for the polygonal mirror 66 is defined by 4×m (m: a natural number). For example, four (=4×1) or eight (=4×2) mirror surfaces are provided for the polygonal mirror 66. The polygonal mirror 66 is reliably coupled to the rotor 54 of a motor 60 by means of a stop ring 62 and a spring member 64. The rotor 54 is rotatably supported by a bearing 56 which is integrally formed with the shaft 52 of the motor 60, and the bearing 56 supports the rotor 54 and the shaft 52 such that the rotor and the shaft 52 can rotate smoothly.

The laser beam L generated by the laser diode 12 is converged or collimated by the glass lens 14. When passing through the stop 22, the laser beam L is shaped to have a predetermined cross section. The laser beam L emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18. When passing through the second plastic lens 18, the laser beam L is converged in both the main scanning direction and subscanning direction.

The laser beam L emerging from the second plastic lens 18 is directed to one deflecting mirror surface 68 of the polygonal mirror 66 of the scanner 50. After being reflected by the deflecting mirror surfaces 68, the laser beam L is directed at a nonuniform angular velocity to the third plastic lens 72, which functions as a kind of $f\theta$ lens, as mentioned above. In the main scanning direction, the third plastic lens 72 suppresses the adverse effects caused by the field curve and corrects the distortion aberration to a desirable value. In the sub-scanning direction, the third plastic lens 72 corrects the positional shift of the laser beam L on the photosensitive body 90, even if each mirror surface 68 of the polygonal mirror 66 tilts. The laser beam L emerging from the third plastic lens 72 is directed to the photosensitive body 90 by way of the dust-preventing cover 76.

In this type of optical system, it may happen that the reflecting mirrors of the scanner will not be held accurately at an intended angle (so-called mirror tilting problem). If this happens, the point H to which a laser beam is actually irradiated is shifted from the right position h, due to the curvature of the $f\theta$ lens. As a result, the $f\theta$ characteristic is adversely affected. In addition, the field curve (image distortion at the point h to which the laser beam should be irradiated) is also adversely affected. In order to improve the $f\theta$ characteristic and the field curve, as well as other optical characteristics, the mirror surfaces 68 of the polygonal mirror 66 are provided with a particular adequate curvature.

For example, the curvature of the mirror surfaces 68 is represented by the formula below, if the angle of rotation of each mirror surface 68 is 0°, $$R/Z_0 = (1/\cos\theta/(1+\cos\theta)-1)$$

where:

$\theta$ is an angle at which the polygonal mirror 66, i.e., each mirror surface 68, is rotated;

Z is the distance between a given deflection point on a mirror 68 and the surface of the photosensitive body 90. The subscript $\theta$ of $Z_\theta$ denotes the corresponding angle of rotation of the polygonal mirror 66. If $\theta=0°$, the above distance is represented by $Z_0$; and R is a radius of curvature of each mirror surface 68.

In connection with the above equation, it should be noted that the value of $R/Z_0$ is always greater than 0.5 without reference to the value of $\theta$.

As is well known in the art, where the value of the $R/Z_0$ is greater than 0.5, the characteristics of the laser beam, i.e., an image, irradiated onto the photosensitive body are adversely affected. That is, the $f\theta$ characteristic, the field curve, the distortion aberration, etc., are adversely affected.

The $f\theta$ characteristic will be explained. The $f\theta$ characteristic is the difference F between the following two: one is position H to which the laser beam L actually reaches and the other is the theoretical position h which the laser beam L reflected by the mirror surfaces 68 reaches. That is, the fθ characteristic F is given by:

$$F = (H - h) \times 100/h \, (\%)$$
$$= (H - f\theta) \times 100/f\theta \, (\%)$$

The fθ characteristic varies from "−" to "+" in accordance with an increase in the absolute value of the angle θ of rotation of the mirror surfaces 68. The symbols "−" and "+" used with the fθ characteristic indicate how H and h are related to each other in the Y-axis direction, i.e., in the main scanning direction (θ>0). If H>h, the relationship is "+", and If H<h, the relationship is "−". As may be understood from this, the third plastic lens 72 should be an f.θ lens which is specially shaped such that the power of the center portion of the lens is smaller than that of the circumferential portion. However, if such a special type of fθ lens is used, the field curve is inevitably shifted to the side of the polygonal mirror 66, noted by the symbol "+" in accordance with an increase in the angle of rotation of the mirror surfaces 68. The symbols "+" and "−" used with the field curve indicate the direction in which the focus of the laser beam L directed to the photosensitive body 90 is shifted from a given reference position. If the focus of the laser beam L is shifted from the reference position toward the interior of the photosensitive body 90, the shifting direction is represented by "−". If the focus of the laser beam L is shifted from the reference position in the opposite direction, the shifting direction is represented by "+".

In the embodiment of the present invention, the values of R and $Z_0$ are determined as follows:

$$R = 79.65 \text{ mm}, Z_0 = 187.12 \text{ mm}$$

Therefore, the curvature of the mirror surfaces 68 of the polygonal mirror 66 satisfies the relation $R/Z_0 < 0.5$.

By combining the mirror surfaces 68 and the third plastic lens 72 which satisfy the above equations, the field curve and fθ characteristic can be controlled to have adequate values with reference to the surface of the photosensitive body 90.

Figure 2A:
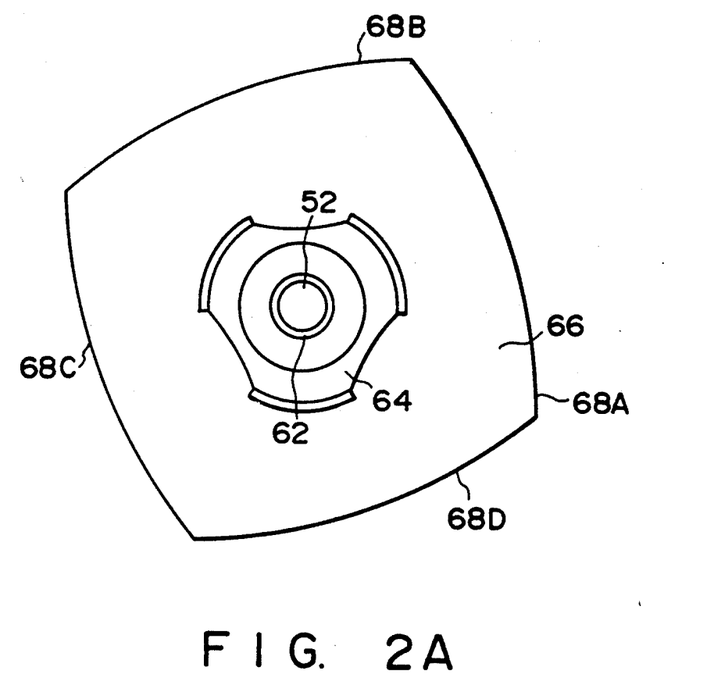
FIG. 2A is a plan view illustrating a polygonal mirror and a motor shaft which are fastened to each other.
Figure 2B:
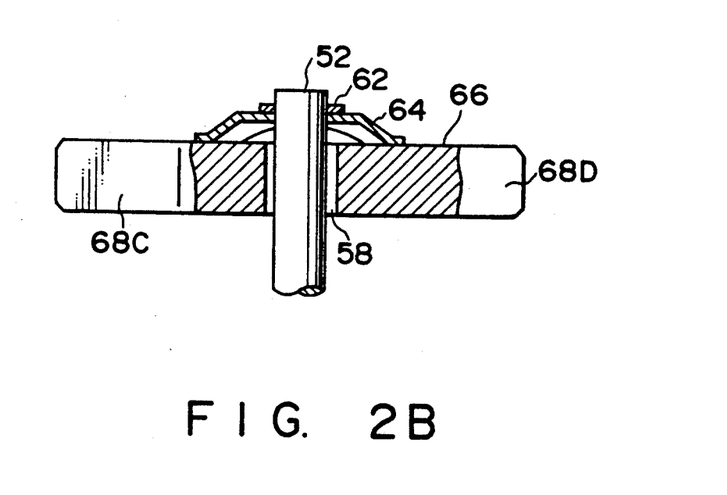
FIG. 2B is a sectional view of the polygonal mirror and motor shaft illustrated in FIG. 2A.

Referring to FIGS. 2A and 2B, the polygonal mirror 66 has a through hole 58 for receiving the shaft 52 of the motor. The polygonal mirror 66 is first pressed against the bearing surface of the rotor 54 which is integrally fixed to the shaft 52 by crimping or the like, and is then secured to the rotor 54 by means of a stop ring 62. More specifically, the polygonal mirror 66 is pressed against the bearing surface of the rotor 54 by means of a spring member 64 with a pressure of several Kg/cm². Positioned with high accuracy in this manner, the polygonal mirror 66 is held to the rotor 54 by means of the stop ring 62. The distance between the center of the polygonal mirror 66 and each of the mirror surfaces 68A, 68B, 68C and 68D is corrected in a method which will be mentioned later. In the case where the polygonal mirror 66 is held to the rotor 54 in the above method, the shaft 52 is also prevented from rotating in a runout condition, even if the shaft 52 is slanted with reference to the motor 60.

The polygonal mirror 66 can be obtained by cutting a metallic material. Alternatively, it can be obtained by molding a metallic material or a resin material. The resin material may be a material which allows a laser beam to pass therethrough. If this kind of resin material is used, a material having a high reflectance, such as aluminum, is evaporated on each mirror surface 68, or a reflectance-improving agent, such as liquefied aluminum for brightening, is coated on each mirror surface 68. The evaporation of the high-reflectance material or the coating of the reflectance-improving agent may also be performed in the case where the polygonal mirror 68 is formed of a metallic material.

Figure 3A:
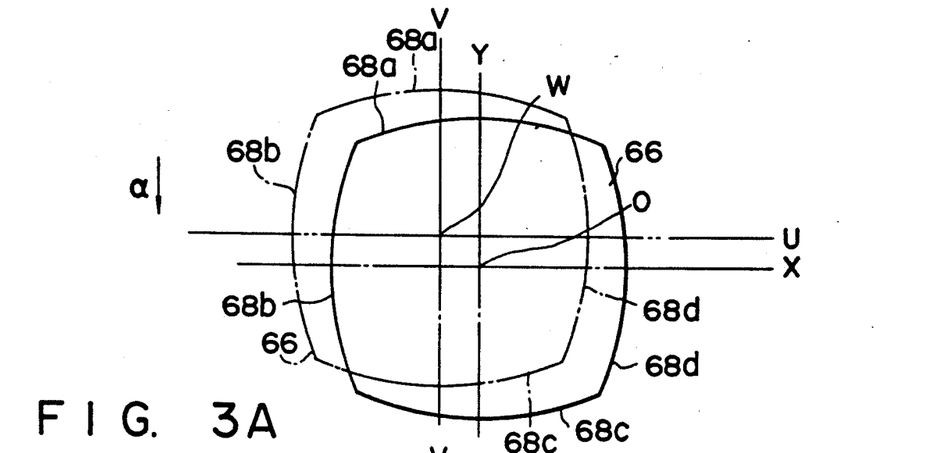
FIGS. 3A through 3C are schematic views of a positioning method and its underlying principles, the schematic views in FIGS. 3A–3C illustrating how the motor shaft and a polygonal mirror provided with four reflecting surfaces are positioned with reference to each other.
Figure 3B:
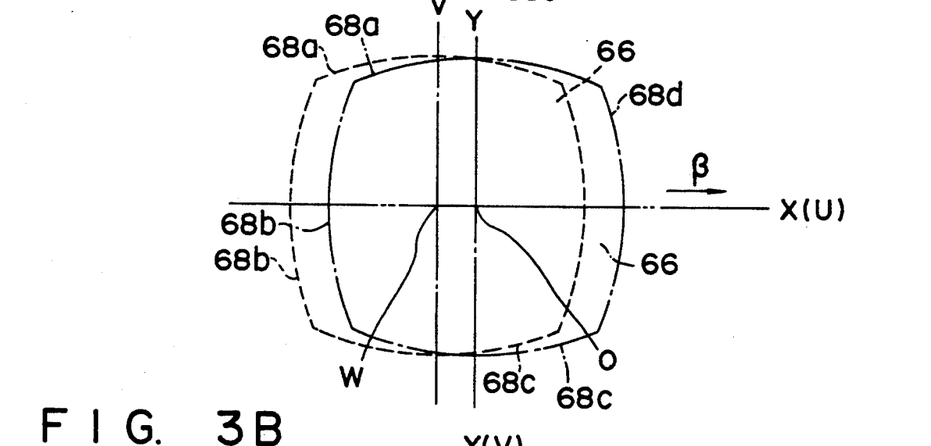
Figure 3C:
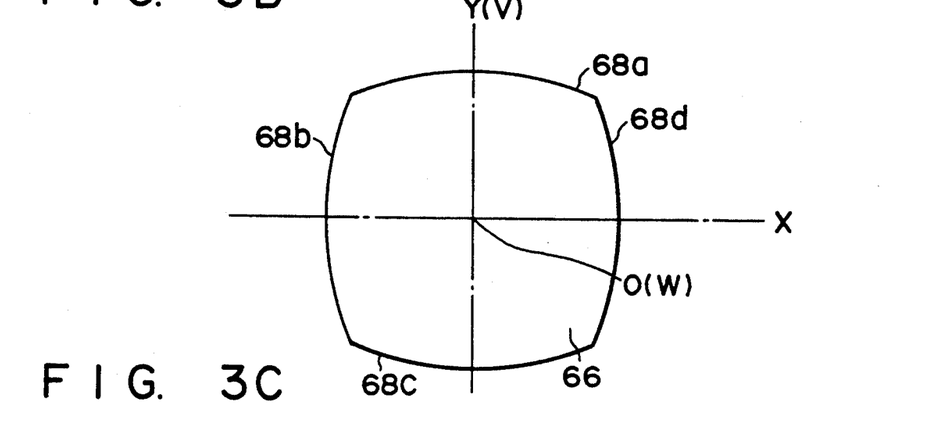

FIGS. 3A through 3C illustrate how the polygonal mirror 66 and the shaft 52 are positioned with reference to each other. The polygonal mirror 66 illustrated in FIGS. 3A–3C is provided with 4×1 mirror surfaces, namely, mirror surfaces 68a, 68b, 68c and 68d. An axis which is perpendicular to both a tangent of the mirror surface 68b and a tangent of the mirror surface 68d and which passes the center is used as a reference axis X; likewise, an axis which is perpendicular to both a tangent of the mirror surface 68a and a tangent of the mirror surface 68c and which passes the center is used as a reference axis Y. Needless to say, these reference axes X and Y are perpendicular to each other. In the description below, it is assumed that a laser beam L is incident on mirror surface 68b in the direction toward the center O of the polygonal mirror 66 while passing along the reference axis X.

In FIG. 3A, a state where the intersection W between axes U and V is shifted from the intersection O between the reference axes X and Y (in relation to which the polygonal mirror 66 should be positioned) is illustrated. In FIG. 3B, the first step performed for positioning the shaft 52 and the polygonal mirror 66 is illustrated. In FIG. 3C, the second step performed for positioning the shaft 52 and the polygonal mirror 66 is illustrated.

In the first step, the polygonal mirror 66 is moved in parallel to axis V (reference axis Y) in the direction indicated by arrow α (FIG. 3A), such that the path of the laser beam incident on mirror surface 68b coincides with the path of the laser beam reflected by mirror surface 68b. With the polygonal mirror 66 moved in this manner, axis U coincides with reference axis X. In other words, the central axis determined with reference to the first pair of opposing mirror surfaces 68b and 68d coincides with reference axis X. During the movement for this coincidence, mirror surfaces 68a and 68c, which are perpendicular to axis X, move in parallel to each other. In the second step, the polygonal mirror 66 is moved in parallel to axis U (reference axis X) in the direction indicated by arrow β (FIG. 3B), such that the beam spot which the incident laser beam L forms on mirror surface 68b has the predetermined diameter. With the polygonal mirror 66 moved in this manner, axis V coincides with reference axis Y. In other words, the central axis determined with reference to the second pair of opposing mirror surfaces 68a and 68c coincides with reference axis Y.

With the above-mentioned two positioning steps being carried out, the polygonal mirror 66 whose mirror surfaces 68 are four (=4×1) in number can be easily positioned with reference to the shaft 52 of the motor.

Figure 4A:
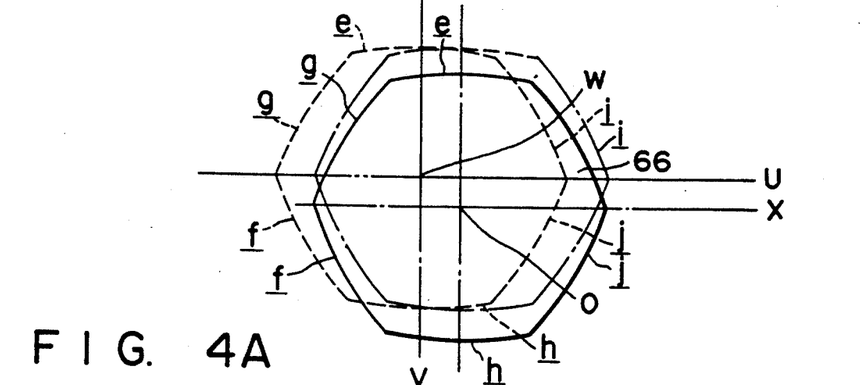
FIG. 4A is a schematic view illustrating how the motor shaft and a polygonal mirror provided with six reflecting surfaces are positioned with reference to each other by use of the method shown in FIG. 3A-3C.

FIG. 4A shows an example taken for comparison with the above embodiment of the present invention, and illustrates the case where a polygonal mirror having six mirror surfaces is employed. In FIG. 4A, the state where the intersection W between axes U and V is shifted from the intersection O between the reference axes X and Y (in relation to which the polygonal mirror should be positioned) is illustrated. In the description below, it is assumed that a laser beam L is incident on mirror surface e in the direction toward the center O of the polygonal mirror while passing along the reference axis Y. In the first step, the polygonal mirror is moved in parallel to axis U (reference axis X) in the direction indicated by arrow γ, such that the path of the laser beam incident on mirror surface e coincides with the path of the laser beam reflected by mirror surface e. With the polygonal mirror moved in this manner, axis V coincides with reference axis Y. In other words, the central axis determined with reference to the first pair of opposing mirror surfaces e and h coincides with reference axis Y. With respect to the polygonal mirror having six mirror surfaces, it should be noted that there is no pair of opposing mirror surfaces which are perpendicular to the mirror surfaces e and h of the first pair. Therefore, similar positioning steps have to be carried out with respect to the mirror surfaces of the other pairs. More specifically, the path of an incident laser beam has to be made coincident with the path of a reflected laser beam with respect to not only the second pair of opposing mirror surfaces f and i but also the third pair of opposing mirror surfaces g and j, after the above-mentioned first step is carried out. This means that the above positioning steps have to be carried out with respect to at least three directions. In addition, fine adjustment may be required after the positioning steps are carried out with respect to all directions.

Figure 4B:
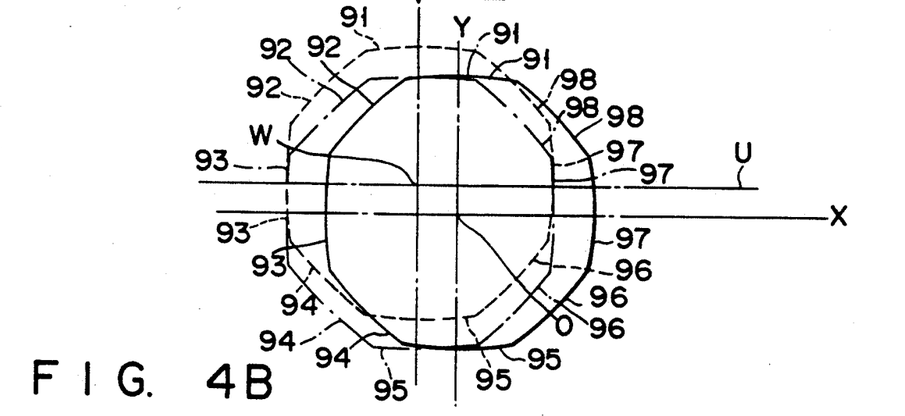
FIGS. 4B and 4C are schematic views of a positioning method and its underlying principles, the schematic views in FIGS. 4B and 4C illustrating how the motor shaft and a polygonal mirror provided with eight reflecting surfaces are positioned with reference to each other.
Figure 4C:
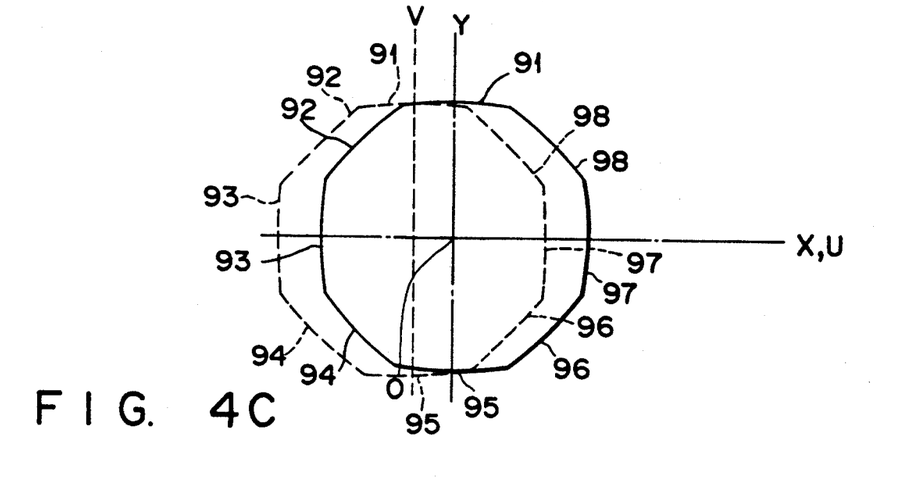

FIGS. 4B and 4C illustrate the case where a polygonal mirror 66 provided with 4×2 mirror surfaces 91-98 is employed. In FIGS. 4B and 4C, the state where the intersection W between axes U and V is shifted from the intersection O between the reference axes X and Y (in relation to which the polygonal mirror 66 should be positioned) is illustrated. The polygonal mirror 66 provided with 4×2 mirror surfaces 91-98 can be easily positioned with reference to the shaft 52 of the motor, by carrying out the steps shown in FIGS. 3A-3C with respect to two perpendicular pairs of mirror surfaces (e.g., the pair of mirror surfaces 91 and 95 and the pair of mirror surfaces 93 and 97). More specifically, in the first step, the polygonal mirror 66 is moved such that mirror surfaces 91 and 95 move in parallel to reference axis X, and in the subsequent second step, it is moved such that mirror surfaces 93 and 97 move in parallel to reference axis Y. With the polygonal mirror 66 moved in this manner, center W coincides with center O, so that the polygonal mirror 66 is positioned accurately with reference to the shaft 52 of the motor. In the polygonal mirror 66 provided with eight mirror surfaces, the central axes determined with reference to the opposing pairs of mirror surfaces are perpendicular to each other. Therefore, the polygonal mirror provided with eight mirror surfaces can be easily positioned with reference to the motor shaft by executing similar positioning steps to those carried out with respect to the four-mirror-surface polygonal mirror.

In the polygonal mirror 66 having eight mirror surfaces, there are four pairs of opposing mirror surfaces, and the central axes determined for two of the four pairs are perpendicular to each other and the central axes determined for the other two pairs are perpendicular to each other. Because of this structure, the positioning steps are required with respect to only two pairs of mirror surfaces whose central axes are perpendicular to each other. If the positioning steps are carried out with respect to two such pairs of mirror surfaces, the other two pairs of mirror surfaces are automatically positioned to such an extent as will not cause any problem in practical use. Accordingly, the polygonal mirror having eight mirror surfaces can be easily positioned with reference to the motor shaft by following similar procedures (namely, the first and second positioning steps mentioned above) to those carried out for the four-mirror-surface polygonal mirror. With only the first and second positioning steps executed, the polygonal mirrors having eight mirror surfaces can be positioned very accurately with reference to the motor shaft.

In the case where the polygonal mirror having four (=4×1) or eight (=4×2) mirror surfaces is positioned, a given pair of opposing mirror surfaces move without causing any adverse effect on the reflection characteristics of another pair of opposing mirror surfaces which are perpendicular to those of the given pair. This is a phenomenon underlying the positioning method mentioned above. In the case where the polygonal mirror having six mirror surfaces is positioned, in contrast, the movement of a given pair of opposing mirror surfaces inevitably results in adverse effects on the reflection characteristics of another pair of opposing mirror surfaces.

As mentioned above, in the case where the polygonal mirror having four (=4×1) mirror surfaces is employed, it is moved such that its two pairs of opposing mirror surfaces move in parallel to the reference axes X and Y, respectively. Specifically, the polygonal mirror is first moved such that one pair of opposing mirror surfaces move in parallel to one reference axis, and is then moved such that the other pair of opposing mirror surfaces move in parallel to the other reference axis. In the case where the polygonal mirror having eight (=4×2) mirror surfaces is employed, positioning steps similar to those effected with respect to the four-mirror-surface polygonal mirror. In the case where the polygonal mirror has as many as twenty reflecting surfaces, easy positioning can be obtained by the same positioning steps as for the four mirror-surface polygonal mirror. In the case where the polygonal mirror has as many as twenty reflecting surfaces, easy position can be obtaiined by the same positioning steps as for the four mirror surface polygonal mirror. In either case, the number of mirrors is in accord with the formula "4×m" where m is a natural numeber, preferably 1 to 5.

In conclusion, a polygonal mirror having 4×m (m: a natural number) mirror surfaces can be easily coupled accurately to the shaft of the motor by utilizing the phenomenon that the movement of a given pair of opposing mirror surfaces does not cause any adverse effect on the reflection characteristics of another pair of opposing mirror surfaces which are perpendicular to those of the given pair.

Additionally, the runout of the motor, which arises from the relative angle between the shaft and the motor, can be easily reduced into an allowable range by making fine positional adjustment between the shaft and the motor by use of the above positioning method. Accordingly, the polygonal mirror can be easily positioned with reference to the shaft of the motor, while being simultaneously prevented from becoming eccentric or tilting with reference to the motor shaft. Further, since the assembly and adjustment of the optical deflector are simplified, it is possible to reduce the manufacturing cost of the entire optical device.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An optical apparatus comprising:
   means for deflecting a light beam, the deflecting means having $4 \times m$ convex surfaces for reflecting the light beam, where m is a natural number from 1 to 5, each of the reflecting surfaces of the deflecting means having a cross section which satisfies the relationship:

$R < 0.5 Z_0$, where
   R is the maximum radius of curvature, and $Z_0$ is the shortest optical distance between a point of reflection and a desired position on an object; and
   means for rotating the deflecting means.

2. An optical apparatus for deflecting a light beam toward an object comprising:
   means for deflecting the light beam toward the object, said deflecting means including four reflecting surfaces each having a cross section which satisfies the relationship $R < 0.5 Z_0$, where R is the maximum radius of curvature and $Z_0$ is the shortest optical distance between a point of reflection and a desired position on the object;
   a shaft element arranged with reference to a center of said deflecting means such that a variation in the distance by which the reflecting surfaces are located away from the center of the shaft element is not more than about 5 μm; and
   means for rotating the shaft element.

3. An optical apparatus comprising:
   means for generating a light beam;
   means for deflecting the light beam generated by the generating means, the deflecting means having $4 \times m$ surfaces, each surface having a cross section which is convex in a direction toward the generating means, for reflecting the light beam generated by the generating means, where m is a natural number from 1 to 5 and where each of the reflecting surfaces of the deflecting means has a cross section which satisfies the relationship:

$R < 0.5 Z_0$, where
   R is the maximum radius of curvature, and
   $Z_0$ is the shortest optical distance between a point of reflection and a desired position on an object;
   where light beam reflecting surfaces are paired and the central axes defined by each of the paired surfaces are at right angles to each other;
   means for holding the deflecting means; and
   means for rotating the holding means to direct the light beam deflected by the deflecting means to said object.

* * * * *